3,055,846
COMPOSITION COMPRISING PARTICLES OF A BLOWING AGENT COATED WITH A DESENSITIZING OIL AND A MODIFIER AND A PLASTISOL COMPOSITION CONTAINING SAME

Carl B. Flack, Woodbury, and Eugene R. Gray, Pitman, N.J., assignors to E. I. du Pont de Nemours and Company, Wilmington, Del., a corporation of Delaware
No Drawing. Filed Aug. 24, 1960, Ser. No. 51,548
6 Claims. (Cl. 260—2.5)

This invention relates to a novel and useful blowing agent composition for the preparation of cellular structures.

Cellular structures, such as sponges, cushions, and the like are prepared by incorporating a blowing agent within a plastisol composition and activating the blowing agent, generally during a curing treatment for the plastisol, to provide cavities and voids throughout the plastisol. The objective in most of these procedures is to provide a cellular structure characterized by uniform cavities or voids. Compositions which are suitable as blowing agents, however, tend to agglomerate in storage and extensive milling procedures are required to uniformly incorporate the blowing agent throughout the plastisol composition and insure uniform voids. Various coatings have been suggested for the blowing agent to inhibit the agglomerating tendency but no coating developed to date has completely solved the problem associated with these blowing agents.

A widely used blowing agent comprises N,N'-dinitroso-N,N'-dimethylterephthalamide mixed with a desensitizing oil, such as white mineral oil. In the preparation of this mixture, a substantial amount of residual water is present and it is necessary to filter the oil mixture on a nutsch to separate the water. The wet filter cake obtained on the nutsch is lumpy and sticks together and must be granulated after drying to obtain satisfactory physical form for packing and shipping. Even in this condition, agglomerates of the blowing agent still form.

These difficulties are obviated in accordance with this invention by providing a blowing agent comprising from about 50 to about 85 parts by weight of particles of N,N'-dinitroso-N,N'-dimethylterephthalamide completely coated with a composition comprising a desensitizing oil and a modifier selected from the group consisting of (1) glycolic esters of fatty acids, (2) long chain (greater than 9 carbon atoms) hydrocarbon mono-substituted phenols, (3) long chain (greater than 9 carbon atoms) hydrocarbon di-substituted phenols, (4) lecithins of the general structure

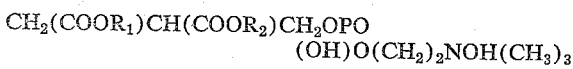

in which $R_1$ and $R_2$ are alkyl chains of fatty acids, (5) mixtures of oxidized petroleum hydrocarbons with a maximum acid number of 7 and a maximum saponification number of 65, and (6) metal salts of naphthenic acid mixed with an organic polymer.

This novel blowing agent may be prepared by adding the desensitizing oil and other ingredients to an aqueous slurry of the N,N'-dinitroso-N,N'-dimethylterephthalamide to form a granular mixture. This granular mixture is then filtered at a rapid rate to give a composition which is almost free flowing. This composition may then be dried quite readily to a free flowing, granular product which does not agglomerate during normal packaging and shipping operations.

For optimum results, the coating component should contain from about 1 to about 5% by weight of one of the modifiers, the remainder of the coating being the desensitizing oil. A most preferred blowing agent is composed of about 70 parts by weight of the N,N'-dinitroso-N,N'-dimethylterephthalamide, about 28.5 parts by weight of the desensitizing oil and about 1.5 parts by weight of one of the various additives.

The following examples illustrate specific embodiments of the compositions of this invention. All parts are by weight unless otherwise specified.

EXAMPLE I

Dipropylene glycol monooleate (a glycolic ester of a fatty acid) is added to a white mineral oil (sold under the trade-name of "Primol D") to give a 95/5 mixture. This mixture is added to a N,N'-dinitrose-N,N'-dimethylterephthalamide/water slurry (1/4.5). After stirring for 15 minutes, the slurry is filtered and dried in a conventional manner to produce a granular, free-flowing dry mix of 70.6 parts of N,N'-dinitroso-N,N'-dimethylterephthalamide, 27.9 parts of the mineral oil and 1.5 parts of the dipropylene glycol monooleate with a total weight of 510 grams of material.

EXAMPLE II

An aqueous slurry containing 35 grams of N,N'-dinitroso-N,N' - dimethylterephthalamide, 14.25 grams of Primol D and 0.75 gram of dipropylene glycol monooleate is prepared and filtered as in Example I to provide a filter cake weighing 74.2 grams (32.5% water). This cake dries to 50.2 grams (0.24% water) in 20 hours. A second aqueous slurry is prepared in a similar manner from 35 grams of N,N'-dinitroso-N,N'-dimethylterephthalamide and 15 grams of Primol D. This slurry is filtered to provide a filter cake weighing 95.2 grams (45.0% water) which dries to only 53.7 grams (7.4% water) in 20 hours.

EXAMPLE III

Dodecylphenol (a long chain hydrocarbon monosubstituted phenol) is substituted for dipropylene glycol monooleate in Example I and a dry mixture of the following composition is obtained. 75.5 parts N,N'-dinitroso-N,N'-dimethylterephthalamide, 23.3 parts Primol D, and 1.2 parts dodecylphenol. Similar improvements in processing and physical appearance as in Examples I and II are obtained.

EXAMPLE IV

Clearate B–60 [a soya bean lecithin of the following general structure

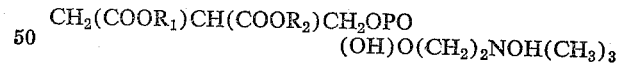

wherein $R_1$ and $R_2$ are alkyl chains of fatty acids], containing 65% of lecithin, 33.5% of soya oil and 1.5% moisture, is substituted for the dipropylene glycol monooleate of Example I and a dry mixture of the following composition is obtained: 77.2 parts N,N'-dinitroso-N,N'-dimethylterephthalamide, 21.6 parts Primol D, and 1.1 parts Clearate B–60 with a total weight of 1316 grams. The physical appearance and processing improvements as in Examples I and II, respectively, are obtained.

EXAMPLE V

Alox 940 (a mixture of oxidized petroleum hydrocarbons, carboxylic, and carbonyl groups) is substituted for the dipropylene glycol monooleate of Example I and a dry mixture of the following composition is obtained: 71.8 parts N,N'-dinitroso-N,N'-dimethylterephthalamide, 26.6 parts Primol D and 1.4 parts Alox 940 with a total weight of 1064 grams. Similar improvements as in Examples I and II are obtained. The Alox 940 of this Example has an acid number of 7 (maximum); saponification number of 65 (maximum); flash point 290° F.

(minimum); and a density of 0.898 grams per milliliter.

EXAMPLE VI

Nuade X401 (a dispersion of butadiene styrene rubber and zinc naphthenate in mineral spirits and naphtha, and having a solids content of 30%, a specific gravity of 0.81 to 0.86 at 80° F. and a flash point of 104° F.) is substituted for dipropylene glycol monooleate, Conoco H300 (a desensitizing mineral oil) is substituted for Primol D in Example I and a dry mixture of the following composition is obtained: 73.8 parts N,N'dinitroso-N,N'-dimethylterephthalamide, 24.9 parts Conoco H300, 1.3 parts Nuade X401 with a total weight of 1145 grams. Once again, similar improvements as in Examples I and II are obtained.

The modifier added to the blowing agent coating in accordance with this invention not only improves the processing and physical appearance of the blowing agent, but it improves the product so that satisfactory cell structure will be obtained in foamed cellular products without milling or other high shear procedures. The following examples illustrate the effectiveness of these additives in modifying the blowing agent so that satisfactory cell structure is obtained in the foamed cellular body. In the following examples one of two procedures is followed to illustrate the effectiveness of the blowing agent.

Procedure 1

The blowing agent is tested for effectiveness in providing open-cell wafers and sponges by mixing the modified blowing agent into the following low viscosity plastisol (13,600 centipoises) using a Hobart mixer for a 30-minute blending cycle.

FORMULATION A (POLYMERIC)

| | Parts |
|---|---|
| Geon 121 [poly(vinyl chloride)] | 500 |
| Paraplex G-62 (epoxidized soya bean oil) | 250 |
| Paraplex G-50 (polymeric polyester plasticizer) | 250 |
| Advastab BC-105 (barium-cadmium complex) | 10 |
| Neutral calcium petronate (calcium sulfonate complex of an alkyl aryl petroleum sulfonate) | 18 |
| Ti-Pure R-610 (titanium oxide) | 10 |
| Blowing agent | 50 |

The plastisol is foamed and fused for 25 minutes at 165° C. in a forced draft circulating oven. The cavities or voids in the resulting wafers are examined to determine if satisfactory cell structures have been obtained. The plastisols are also foamed for 25 minutes at 100° C. in a hot air oven and fused in a forced draft circulating oven for 25 minutes at 165° C. and the resulting sponges are examined for any detrimental effect of the additive composition on the foaming characteristics.

EXAMPLE VII

The blowing agent of Example I is immediately tested in accordance with Procedure 1. The cell structure of both the wafers and the sponges from the plastisol containing the modified blowing agent is uniform. Satisfactory cell structures are also obtained from similar foaming tests carried out on the same sample after storage at room temperature in a closed container for 30 days.

This procedure was also followed to test the blowing agents of each of Example III, IV, V and VI and similar results were obtained both with the blowing agent immediately after drying and the blowing agent which had been stored for a period of 30 days.

EXAMPLE VIII

Emery dimer acid (a dimerized, or polymerized organic fatty acid; essentially a 36 carbon atom dibasic acid resulting from the polymerization of $C_{18}$ unsaturated fatty acids) is substituted for dipropylene glycol monooleate of Example I and a dry mixture of the following composition is obtained: 70 parts N,N'-dinitroso-N,N'-dimethylterephthalamide, 28.5 parts Primol D and 1.5 parts Emery dimer acid with a total weight of 500 grams. This sample is tested for cell structure in the foamed poly(vinyl chloride) plastisol sponges prepared according to Procedure 1, both when intitally dried and after a storage period of 30 days. In all cases the modified blowing agent gives satisfactory cell structure in the resulting wafers and sponges.

Procedure 2

Closed-cell sponges are prepared by foaming the following low viscosity plastisols, prepared using a 30 minute mixing cycle in a Hobart mixer.

| | Parts |
|---|---|
| Geon 121 [poly(vinyl chloride)] | 100 |
| Cabflex DOP (dioctyl phthalate) | 100 |
| Dyphos (dibasic lead phosphite) | 5 |
| Blowing agent | 25 |

After the plastisol is mixed for 30 minutes, a sample is charged to a stainless steel mold, placed under the platens of a hydraulic press, and heated for 5 minutes with steam at 120 pounds per square inch gauge. The mold is cooled for 5 minutes while it is still under 3200 pounds per square inch gauge pressure, after which the sponge is removed and post-expanded in a circulating hot-air oven for 15–20 minutes at 100° C.

EXAMPLE IX

The following samples are tested for cell structure in the foaming of polyl(vinyl chloride) plastisol systems for open-cell sponges in accordance with Procedure 1, and also tested for cell structure in the foaming of poly(vinyl chloride) plastisol systems for closed-cell sponges in accordance with Procedure 2.

| | Grams |
|---|---|
| (1) 73.6/25.1/1.3 N,N'-dinitroso-N,N' - dimethylterephthalamide/Primol D/Clearate B-60 | 1136 |
| (2) 72.9/25.7/1.4 N.N' - dinitroso-N,N'dimethylterephthalamide/Primol D/Alox 940 | 1107 |

In each instance, the modified blowing agent gives satisfactory uniform cell structure in both the open-cell and closed-cell sponges.

Any compatible oil of low volatility is suitable as the desensitizer, although usually a paraffin hydrocarbon such as white mineral oil is preferred. The modified blowing agent is particularly useful in poly(vinyl chloride) plastisol systems, but is readily useful in other systems which utilize blowing agents, e.g., natural and synthetic rubbers, urethane elastomers and epoxy resins.

The modified blowing agent of this invention provides more efficient processing in eliminating the need for expensive roll-milling or similar high-shear equipment in the preparation of the plastisol mix. The drying cycle for the filter cake is reduced by about 50% using the modified coating agent of the present invention, since the addition of the modifier changes the texture of the blowing agent to a granular material so that it filters faster with the filter cake containing only 35–40% water as compared to the 45–50% water when no modifier is added. This difference in water content provides a granular material compared to a sticky and lumpy material as provided previously. Hazard tests show that the modified blowing agent is comparable to the unmodified blowing agent in thermal stability, impact sensitivity and decomposition pressure so that the modified blowing agent can also be classed as a flammable solid safe for manufacture, packing and shipment.

Not only are there many process advantages from the use of the blowing agent of this invention, but also the products prepared therefrom are characterized by more uniform cell structure. Many other advantages will become apparent to those skilled in the art from the practice of this invention.

We claim:
1. A composition of matter comprising particles of N,N'-dinitroso-N,N'-dimethylterephthalamide completely coated with a desensitizing oil and a modifier selected from the group consisting of (1) glycolic esters of fatty acids, (2) long chain hydrocarbon monosubstituted phenols having from 9 to 12 carbon atoms, (3) long chain hydrocarbon disubstituted phenols having from 9 to 12 carbon atoms, (4) lecithins of the general formula

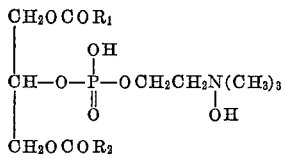

in which $R_1$ and $R_2$ are alkyl chains of fatty acids; (5) a mixture of oxidized petroleum hydrocarbons containing carboxylic acid and carbonyl groups with a maximum acid number of 7, a maximum saponification number of 65 and a density of 0.899 gram per milliliter; and (6) the zinc salt of naphthenic acid mixed with a butadiene styrene polymer.

2. The composition of matter of claim 1 wherein the desensitizing oil is a white mineral oil.

3. The composition of claim 1 wherein the modifier comprises up to 5% of the coating component.

4. The composition of claim 1 wherein the N,N'-dinitroso-N,N'-dimethylterephthalamide is present in an amount of about 70%; the desensitizing oil is present in an amount of about 28.5% by weight, and the modifier is present in an amount of about 1.5% by weight.

5. A resinous plastisol comprising individual particles of N,N'-dinitroso-N,N'-dimethylterephthalamide coated with a desensitizing oil and a modifier selected from the group consisting of

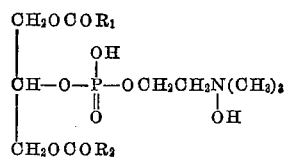

wherein $R_1$ and $R_2$ are alkyl chains of fatty acids.

6. A plastisol of claim 5 wherein the resin is poly(vinyl chloride).

References Cited in the file of this patent

UNITED STATES PATENTS 2,904,522   Catlin et al. _____ Sept. 15, 1959